US008588376B2

(12) United States Patent  
Kennedy et al.

(10) Patent No.: US 8,588,376 B2  
(45) Date of Patent: Nov. 19, 2013

(54) SYSTEM FOR AUTOMATIC TTY EQUIPMENT DETECTION AND FOR NOTIFICATION OF THE HEARING IMPAIRED

(75) Inventors: James Lehr Kennedy, Columbus, OH (US); Robert William Hames, Jr., Columbus, OH (US); Joseph E. Zarick, Columbus, OH (US); James Francis Curran, Alexandria, OH (US); Christopher White, Columbus, OH (US)

(73) Assignee: West Notifications, Inc., Omaha, NE (US)

( * ) Notice: Subject to any disclaimer, the term of this patent is extended or adjusted under 35 U.S.C. 154(b) by 609 days.

(21) Appl. No.: 12/710,878

(22) Filed: Feb. 23, 2010

(65) Prior Publication Data

US 2011/0206189 A1 Aug. 25, 2011

Related U.S. Application Data

(60) Provisional application No. 61/230,379, filed on Jul. 31, 2009, provisional application No. 61/154,617, filed on Feb. 23, 2009.

(51) Int. Cl.  
*H04M 11/00* (2006.01)

(52) U.S. Cl.  
USPC .......................................... 379/52; 379/93.01

(58) Field of Classification Search  
USPC ................................................ 379/52, 93.01  
See application file for complete search history.

(56) References Cited

U.S. PATENT DOCUMENTS

2006/0056598 A1* 3/2006 Brandt et al. .................... 379/52  
2007/0043503 A1* 2/2007 Oesterling et al. ............ 701/211

* cited by examiner

*Primary Examiner* — Quynh Nguyen

(57) ABSTRACT

The invention is directed to efficient notification of the hearing impaired during emergencies. A message initiating agency and an administrator create an outbound message for delivery and further selects a number of campaign related parameters. A telecommunications interface module is provided that is capable of detecting the presence of a connected TTY device, and a connected TTY device logging system for recording in a database the occurrences of detection of a TTY devices associated with a particular telecommunications interface, or outbound message contact. The system delivers the campaign message to one or more telecommunications interfaces, delivers a TTY compatible message or a provides notification to said administrator of the detection of a connected TTY device, and records the incidence of failures to deliver the campaign message.

24 Claims, 5 Drawing Sheets

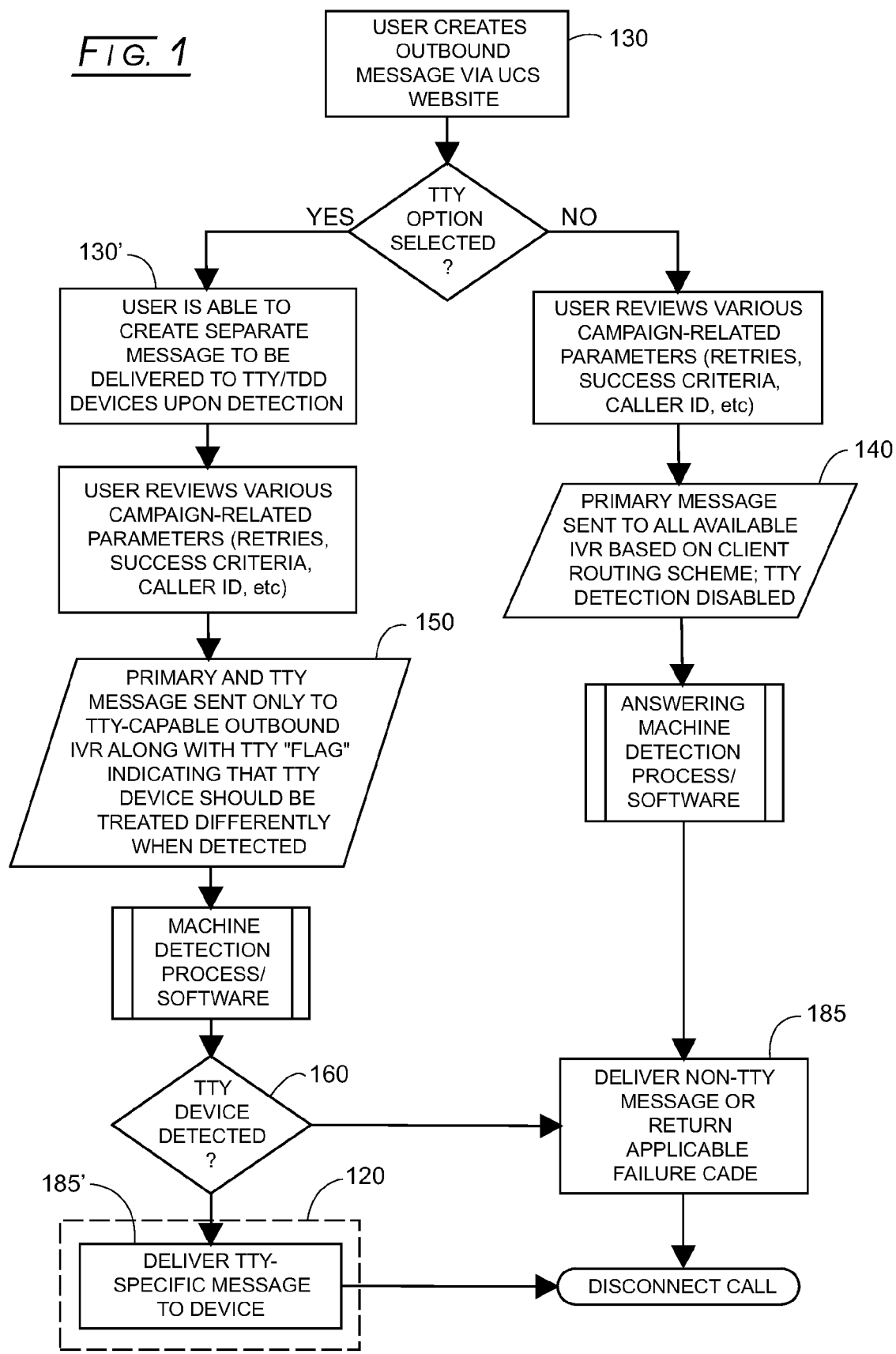

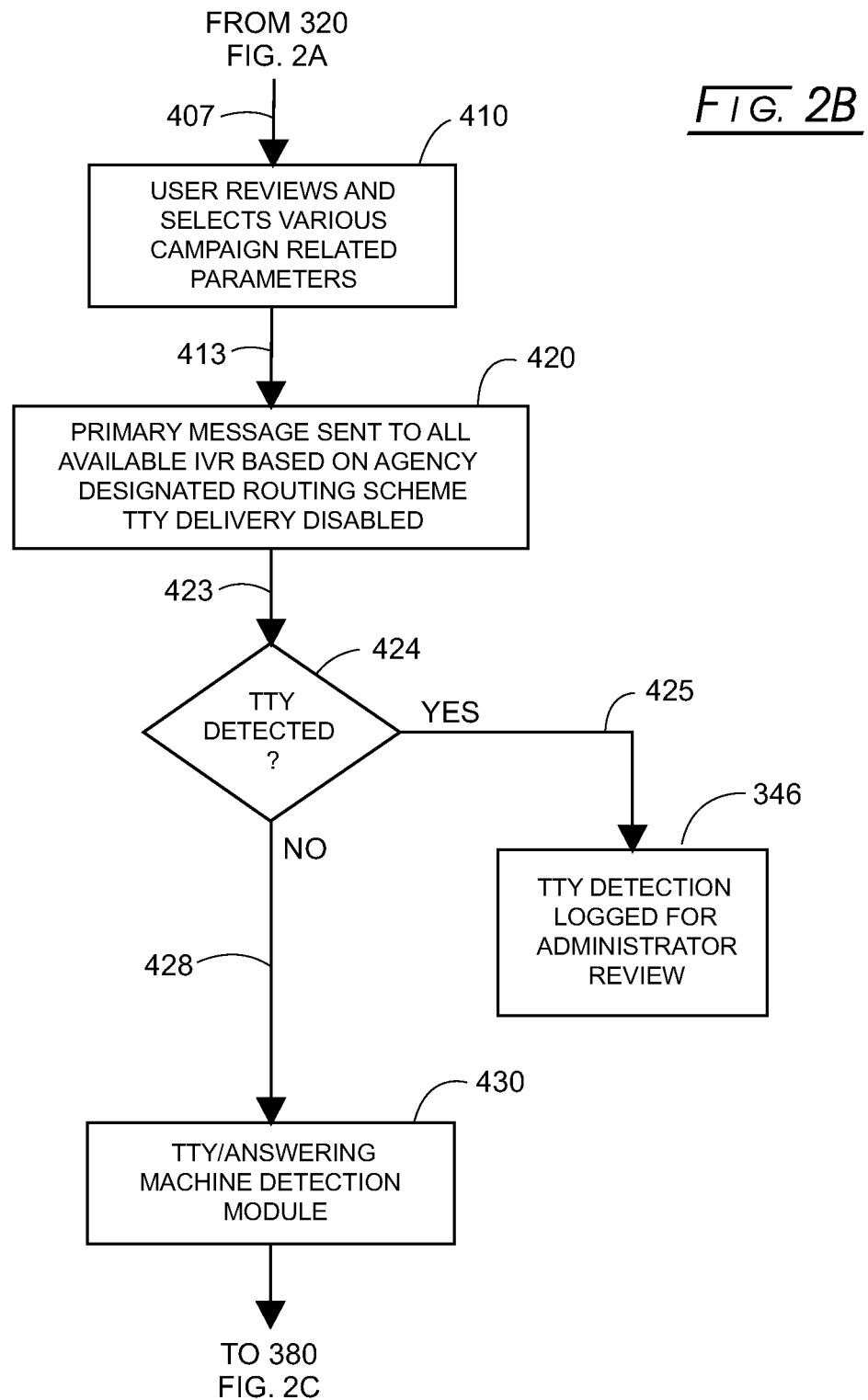

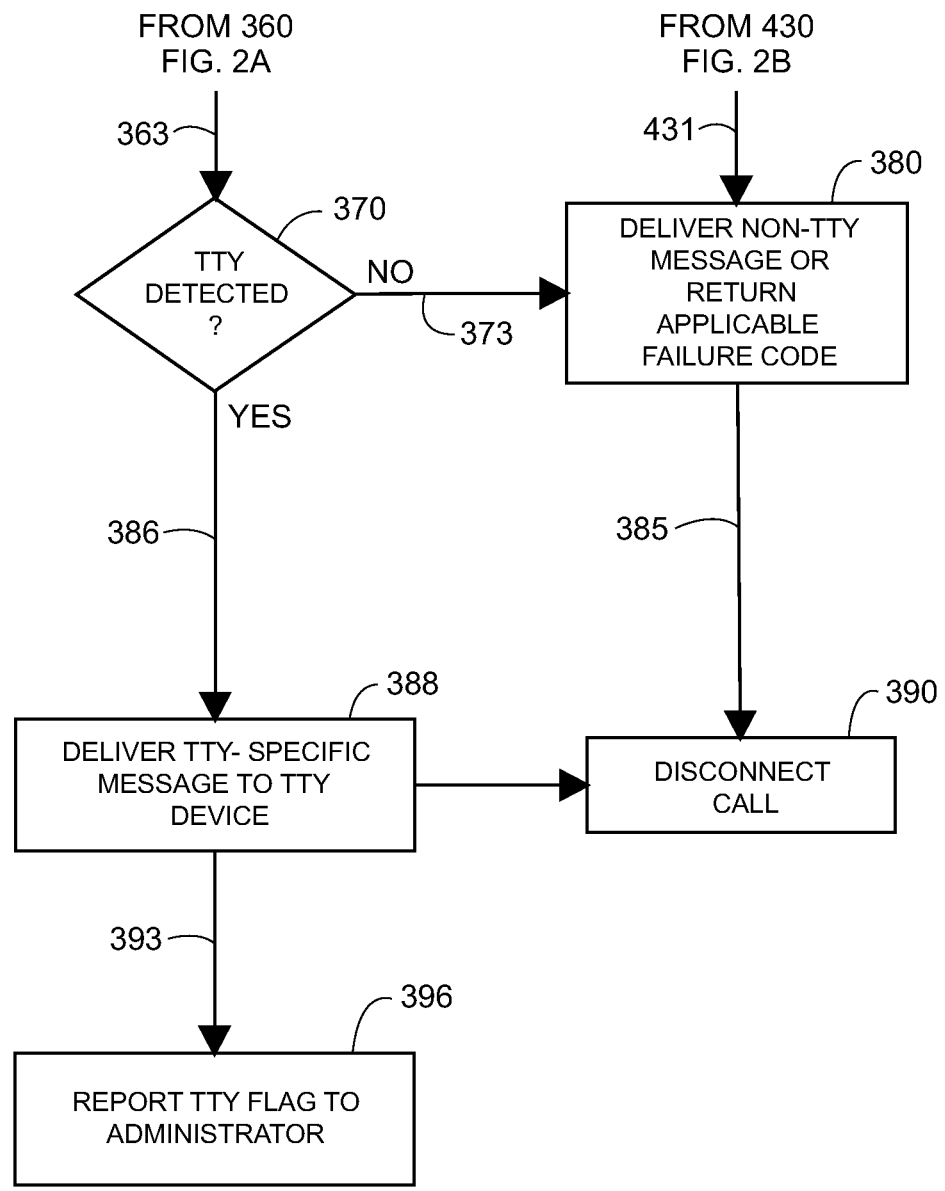

SYSTEM FOR AUTOMATIC TTY EQUIPMENT DETECTION AND FOR NOTIFICATION OF THE HEARING IMPAIRED

CROSS-REFERENCE TO RELATED APPLICATIONS

This application claims the benefit of the filing date of U.S. Provisional application Ser. No. 61/154,617, filed Feb. 23, 2009, and U.S. Provisional application Ser. No. 61/230,379, filed Jul. 31, 2009, the entire contents of which are incorporated by reference herein.

STATEMENT REGARDING FEDERALLY SPONSORED RESEARCH

None

BACKGROUND OF THE INVENTION

The present invention generally relates to detection of telephonic devices for the assistance of the hearing impaired and delivery of directed messages to those utilizing such devices.

Teletype and Telex systems had been in use almost since the origin of the telephone for converting electronic signals to text prints. Bell Labs and AT&T had created a standard coupling between a telephone handset and a modem enabling the transmission and reception of audio tones generated by corresponding typewriter keys. The entire configuration of teletype machine, acoustic coupler, and telephone set became known as the TTY for "telephone typewriter".

Since the 1960's systems have been developed to allow the inter-conversion of audio (sound) signals into electronic signals decipherable by a computing system. The use of an "acoustic coupler" or modem for providing text based communication for the deaf dates to the 1964 invention of a TTY capable device for use with telephone systems by hearing impaired physicist Robert Weitbrecht. For additional background on the history of the development of the TTY systems for use by the hearing impaired, see, H. G. Lang, "A Phone of Our Own," Gallaudet University Press.

The actual mechanism for TTY communications was accomplished electromechanically through frequency shift keying (FSK) at first allowing only one-way (simplex) communication. By 1973 commercial products had been developed, such as the MCM (Manual Communications Module), which was the world's first electronic portable TDD (Telephone Device for the Deaf) allowing two-way (duplex) telecommunications, which was introduced to the public at a California Association of the Deaf convention in Sacramento, Calif. The MCM system utilized the five-bit "Baudot" code utilized by teletype machines for decades instead of the more recent ASCII code that is routinely utilized by personal computers. Although the MCM system was popularized under the TDD nomenclature, and generally supplanted older teletype based communications systems, over time, the term TTY became preferred terminology for any text based communications system for use by the hearing impaired community, including TDD labeled devices. Eventually use of Teletype and Telex machines declined and they were abandoned, in favor of electronic print communications, such as email and facsimile. Today, the acronym TTY is essentially in current use only with respect to communications systems for use by the hearing impaired.

During the 1970s many different companies developed telephone linked text communications systems, leading to a proliferation of communications protocols linking those devices, essentially tracking the expansion and development of modem protocols for communications between network linked computers. Initially, at least, most TTY compatible devices were created in cooperation with telecommunications companies, i.e. AT&T. Prior to the 1980's, telecommunications providers typically restricted attachment of unauthorized private equipment to their telephone system. Unfortunately, the proliferation of TTY systems and machine communication protocols has lead to incompatibilities between systems, and the lack of a standard system prevents general broadcast of messages to all connected TTY devices. For additional background on the operation of TTY compatible systems and the communications protocols associated with them, see U.S. Pat. No. 7,079,628 to Burritt, and U.S. Patent Application Publication No. US 2005/0063520 by Michaelis, and the references thereto.

On many occasions, a variety of agencies, whether governmental, quasi-governmental, public utilities, or private companies have the need to deliver messages through telephonic systems. For instance, a governmental agency may wish to notify certain households of the threat of a natural disaster, such as a wildfire or a hurricane. The agency may initiate an emergency call system that delivers either a telephone message or records a telephone message on the answering machine of households that are at risk. Similarly, citizens may provide their cellular telephone contact information, for instance, and request the delivery of a facsimile, text message or email.

A significant proportion of any population consists of individuals that have one or more disabilities. In particular, the hearing-impaired (i.e. deaf) community represents approximately 1-2% of the population. Many households consist of entirely hearing-impaired individuals. Those households typically utilize a TTY device in order to communicate via telephone and such devices typically provide visual cues of incoming telephone calls, and provide a text based interface between a TTY enabled caller, and the user of the TTY device, i.e. the hearing impaired individual. When an agency seeks to notify households of the occurrence of an event, for instance an impending natural disaster or crisis, the agency seeks to ensure that all identified parties are so notified, including those who are hearing-impaired. Previously available systems could be programmed to deliver emergency messages to all telephones in a given locale (such as warning of approaching hurricane or wildfire). In the past, systems to provide notification of the hearing impaired would require users of hearing assistance communications systems would need to provide prior notice to the agency of their use of such devices as TTY machines. If no notice was provided, the crisis message would only be delivered in the form of an audio message, and the hearing impaired parties would not be able to decipher the audio message, or even recognize the importance of the incoming message. Thus, unfortunately, existing emergency notification systems either require TTY users to self-identify the need to have emergency messages delivered via TTY, or rely on failure-prone systems that do not effectively identify connected TTY devices.

It is well known that even those with the best of intentions either fail to "opt-in" to the delivery of messages in a particular format, or for some reason a message still fails to be delivered in the proper format. In addition, the hearing-impaired may not actually be present at their primary domicile or work location, and may be traveling, even if only for a few days. In such situations, providing location information for delivery of text crisis communications to the range of agencies that may wish to deliver an emergency message is simply impractical. Thus, opt-in systems suffer failures during actual crises that may lead to unnecessary property damage, injury or even death.

There also is a continuing problem with providing TTY notification, because there are a wide variety of TTY devices, and not all devices interact with the telecommunications system in the same manner.

Thus, there is a need for those agencies who may need deliver various notifications to be able to identify those recipients of telephonic notifications where there exists the connection of a device for assisting the hearing impaired. Such a system is needed to be able to decipher the connection of a TTY device, during the progress of a telecommunication contact, i.e., on the fly, and then deliver the appropriate format of message so that the hearing-impaired message recipient receive notification in a timely and efficient manner. Moreover, other emergency contacts may be in need of a system to indicate the need for assistance in an emergency.

There exists an acute need for a system and method that would allow various providers to identify the connection of a TTY device, identify the type of device connected, and deliver a TTY compatible message in times of need. Of particular need is a system that allows confirmation of TTY message delivery, minimizes communications connectivity issues, and records the presence of a TTY device connected to particular number, so that in-person notification can be undertaken, if warranted.

BRIEF DESCRIPTION OF THE DRAWINGS

For a fuller understanding of the nature and advantages of the present invention, reference should be had to the following detailed description taken in connection with the accompanying drawings, in which:

FIG. 1 shows an overview of the TTY detection and message delivery system;

FIG. 2A-C shows an overview of the TTY detection and message delivery system.

SUMMARY OF THE INVENTION

Figure 2A:
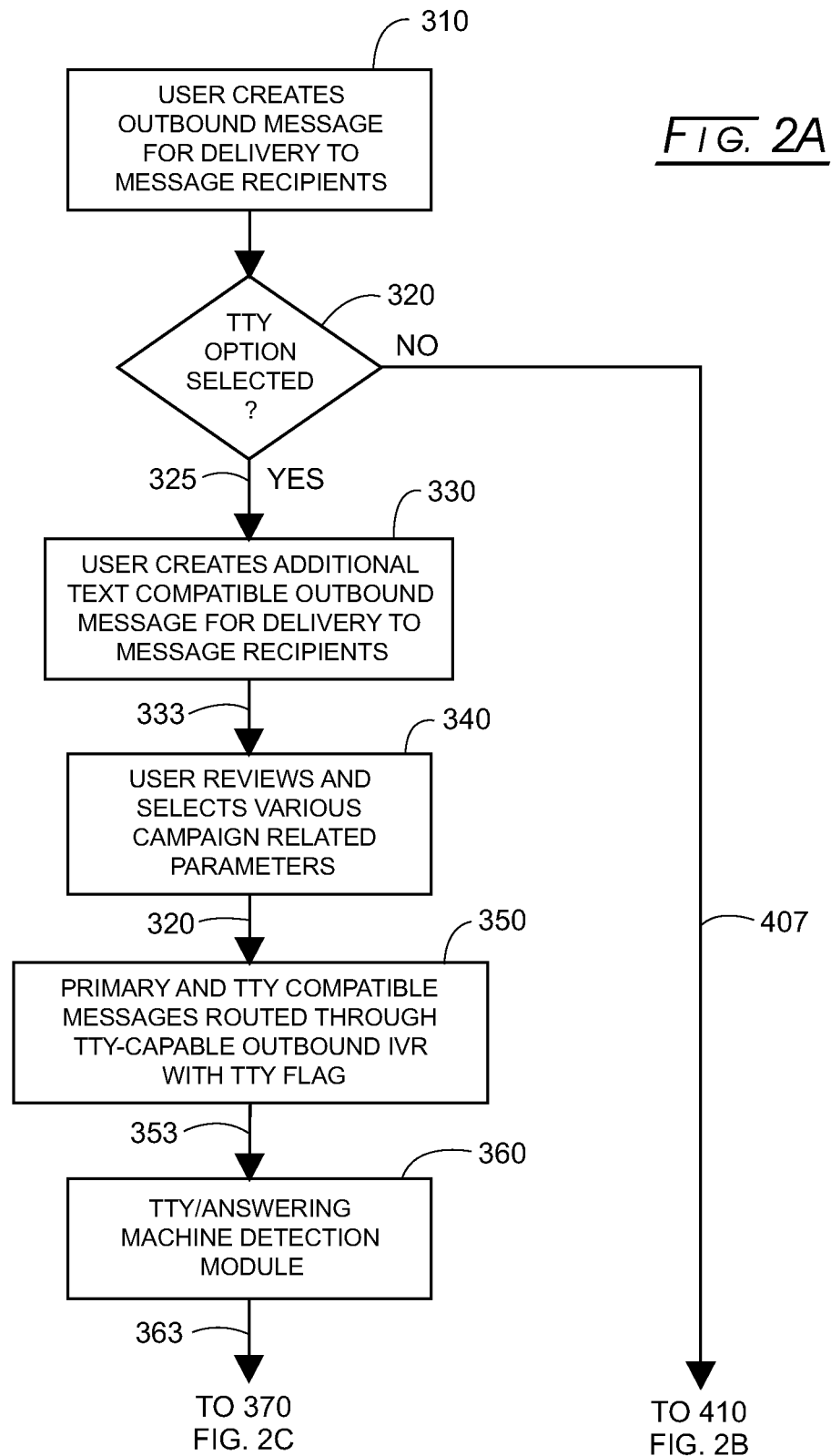

The invention is embodied in a system for delivering campaign messages over a telecommunications system. An administrator for a message initiating agency identified a group of message recipients of an emergency message, and the messages is delivered through a number of telecommunications interfaces that allow for delivery of several types of telecommunications message, including TTY messages, audio messages, SMS messages, emails and voice over internet messages. Thus, the message recipients, or message targets may utilize a wide variety of telecommunications devices to receive messages. The administrator creates an outbound message for delivery to a selection of the telecommunications interfaces associated with message recipients, and further selects a number of campaign related parameters. The administrator is preferably provided with an option for allowing delivery of said outbound message to telecommunications interfaces that include TTY devices. The administrator typically creates a TTY message that is accessible (i.e., activated) when the administrator has selected the option for delivering outbound messages to TTY devices. Further embodied is a telecommunications interface module that is capable of detecting the presence of a connected TTY device and a connected logging system for recording in a database the occurrences of detection of a TTY devices associated with a particular telecommunications interface, and or outbound message contact.

Following activation of the emergency messaging campaign by the administrator, emergency telecommunications messages are then sent through the previously selected telecommunications interfaces to a message recipients according to an agency routing sequence and the campaign message delivering system determined by the administrator selection of campaign related parameters. Following connection of the telecommunications interfaces with the telecommunications interface module, the telecommunications interface module determines whether one or more of a live message recipient, an answering machine a connected TTY device or call failure modes are present, and acts upon that information. The telecommunications interface module then updates the logging database and provides notification of a call result according to the parameters predetermined by the administrator selection of campaign parameters. When the module detects a connected TTY device the delivers a TTY compatible message to the connected TTY device, or provides the system with notification of a call recipient contact failure according to the administrative parameters. Finally the telecommunications interface module may updates the logging database to reflect the detection of a connected TTY device, and disconnects the call. Thus, the system delivers the campaign message to one or more telecommunications interfaces, delivers a TTY compatible message or a provides notification to said administrator of the detection of a connected TTY device, and records the incidence of failures to deliver the campaign message.

The system for delivering campaign messages is further embodied in a system configurable to automatically differentiate between telecommunications interfaces connected to the connected TTY device and those telecommunications interfaces not connected to any connected TTY device. The system may be further configured to determine whether a particular TTY device is connected, and issue a connected TTY device prompt, monitor the connected telecommunications interface for a responsive signal prompt from a connected TTY device, issues a confirmation connected TTY device prompt and further monitor the connected telecommunications interface for a confirmation responsive signal prompt from the connected TTY device. Thus the system has effective means for confirming or querying for the presence of a TTY device. In another embodiment, the telecommunications interface module is configured to monitor a connected telecommunications interface for periodic signals typically issued by a connected TTY device, and when such a signal is detected, further issues a confirmation connected TTY device prompt and further monitors the connected telecommunications interface for a confirmation responsive signal prompt from the connected TTY device. The connected TTY device prompt and the confirmation connected TTY device prompt may be configured as signals with different characteristics, and the messaging system is optionally configurable to automatically differentiate between telecommunications interfaces connected to the connected TTY device and those telecommunications interfaces not connected to any connected TTY device, differentiating between telecommunications interfaces by monitoring the responses received to query prompts issued by the messaging system, with the query prompts being one or more of a speech-based query prompts, a language related speech-based query prompt, a modem handshake query prompt, a hearing-impaired user query prompt, at least one dual tone multi-frequency (DTMF) signal tone query prompt, and a TTY query prompt.

Those skilled in the art will recognize that TTY devices possess an extensive though limited variety of communications protocols. The system for delivering campaign messages over a telecommunications system is further embodied in a system wherein the hearing-impaired user query prompt is suitable for contacting telecommunications interfaces of hearing-impaired users and said hearing-impaired user query prompt is one or more of a Baudot-compliant query prompt, a DTMF signal, an ASCII signal, an approximately 1800 Hz signal, and an approximately 1400 Hz signal. Moreover, the administrator may be provided an option for allowing delivery of said outbound message to telecommunications interfaces that do not include TTY devices, and the system may yet provide notification to the administrator of the detection of a connected TTY device, and the incidence of failures to deliver a campaign message. Subsequently, a follow-up contact may be initiated, either over TTY, or by other means. The response received by the detection module in response to a query prompt may be one or more of a voice response, a machine recognizable voice response, a Baudot-compliant response, a DTMF signal, one or more approximately 1800 Hz signals, one or more approximately 1400 Hz signal, a combination of one or more approximately 1800 Hz signals and approximately 1400 Hz signals, a keyed response, and a keyboard generated DTMF response. The system monitors responses received to a query prompt issued by the messaging system and may be configured to issue a second query prompt when the response to the initial query prompt received from a connected device is not a compliant response.

In a further embodiment, the system is configurable to redirect the telecommunications interface so that it may be connected to one or more of a DTMF compatible platform, a TTY compatible platform, a voice message system, a live operator, and a call-back log, should the telecommunications interface fail to respond to the second query prompt with a compliant response.

The system is configurable so that the telecommunications interface module is capable of identifying a plurality of response signals, wherein the response signal is one or more of a plurality of signals with frequency of approximately 1,800 Hertz, a plurality signals, at least one of which has a frequency of approximately 1,400 Hertz, at least one signal that substantially corresponds to a response expected following the connected TTY device prompt or the confirmation responsive signal prompt, a DTMF tone, speech input from the at least one call recipient, a DTMF response, a Baudot-compliant response, for routing the call to a TDD/TTY platform based on received responses from a connected telecommunications interface. These different communications can be varied according to the responses that re detected, or expected in practice during an emergency messaging campaign. Furthermore, the system for delivering campaign messages over a telecommunications system is configurable for processing the call using a "grammar" that is specially defined for use a connected TTY device.

A further embodiment herein is a method of maintaining and updating a database of telecommunications contacts with identifiable emergency requirements. The method comprises delivering campaign messages over a telecommunications system by an administrator for a message initiating agency directed to a group of message recipients of a message delivered by means of a telecommunications system, with campaign messages directed to a number of telecommunications interfaces that allow for delivery of more than one type of telecommunications messages. The campaign message is an outbound message created by an administrator for delivery to selected telecommunications interfaces, and the administrator optionally allows delivery of the outbound message to interfaces that include TTY devices. The administrator creates a message that includes a TTY compatible message when the administrator has selected the option for delivering outbound messages to TTY devices and may further include an emergency requirement message. Upon activation, the telecommunications interface module is capable of detecting the presence of a connected TTY device, and responses to query prompts relating to the emergency requirement message. An additional embodiment is a logging system for recording in a database the detection of a TTY device associated with a particular telecommunications interface, and responses to a query prompt relating to the emergency requirement message. After the emergency telecommunications message is sent to all available recipients according to an agency routing and the said campaign message delivering system, the telecommunications interface module determines a message delivery status determined by whether one or more of a live message recipient response, an answering machine response, a connected TTY device response, an emergency requirement response or call failure modes are present. Upon detection of an answering machine response, a connected TTY device response, an emergency requirement response or call failure mode, creates a database entry indicating the message delivery status reflecting the response determined, and upon completion of the above steps, disconnects the call. An embodiment disclosed herein is a database of telecommunications contacts with a connected TTY device, an emergency requirement, call failure mode, or other identifiable emergency requirements is updated to reflect the contact information or location of said connected TTY devices, emergency requirements, call failure modes, or other identifiable emergency requirements and provides notification to said administrator of the detection of a connected TTY device, emergency requirements, call failure modes, or other identifiable emergency requirements and the incidence of failures to deliver a campaign message. The contact information or location of telecommunications contacts with a connected TTY device, an emergency requirement, call failure mode, or other identifiable emergency requirements can be provided to one or more public safety agencies for action in response to an emergency. Identifiable emergency requirements include, but are not limited to one or more of lack of transportation, life-threatening emergency, hearing impairment, pets, children, mobility impairment, and limited access.

Yet another embodiment disclosed herein is a method for identifying a call recipient with a connected TTY device comprising a) a system for delivering campaign messages over a telecommunications system;

b) an administrator for a message initiating agency, selecting campaign related parameters;

c) a group of message recipients of a message delivered by means of the telecommunications system;

d) a number of telecommunications interfaces that allow for delivery of a TTY compatible message;

e) an administrator created outbound message allowing delivery of said outbound message to telecommunications interfaces that include TTY devices;

f) a telecommunications interface module that is capable of detecting the presence of a connected TTY device; and h) a logging system for recording the detection of a TTY device associated with a particular telecommunications interface;

i) said telecommunications message is then sent to identified recipients according to an agency routing scheme provided by the administrator, and said telecommunications interface module determines whether one or more of a live message recipient, a connected TTY device or call failure modes are present, and upon detection of a connected TTY device said system delivers a TTY compatible prompt to the connected TTY device;

j) logs the detection of a TTY device associated with a particular telecommunications interface in a database associated with the logging system for recording the detection of a TTY device associated with a particular telecommunications interface; and j) upon completion of the said steps, disconnects the call, Wherein the system provides notification to said administrator of the detection of a connected TTY device, and the incidence of failures to deliver a campaign message and updates a database storing information on the contact parameters for a TTY device associated with a particular telecommunications interface.

Another embodiment of the disclosure is an apparatus for delivering campaign messages over a telecommunications system and identifying a call recipient with a connected TTY device comprising an administrator interface for a message initiating agency allowing selection of campaign related parameters a database of message recipients for an outbound message delivered by means of the telecommunications system, a number of telecommunications interface portals that allow for delivery of a TTY compatible message, a call delivery module storing an administrator created outbound message compatible with delivery of said outbound message to telecommunications interfaces that include TTY devices, a telecommunications interface module that is capable of detecting the presence of a connected TTY device, a logging system for recording the detection of a TTY device associated with a particular telecommunications interface, and a database for recording call delivery and response parameters, wherein said campaign message is sent to message recipients according to an agency routing scheme provided by the administrator, and said telecommunications interface module determines whether one or more of a live message recipient, a connected TTY device or call failure modes are present, and upon detection of a connected TTY device said system delivers a TTY compatible prompt to the connected TTY device, said telecommunications interface module logs the detection of a TTY device associated with a particular telecommunications interface in the database for recording call delivery and response parameters associated with the logging system for recording the detection of a TTY device associated with a particular telecommunications interface, and provides notification to said administrator of the detection of a connected TTY device, and the incidence of failures to deliver a campaign message logs the detection of a TTY device associated with a particular telecommunications interface and updates the database for recording call delivery and response parameters, thereby storing information on the contact parameters for a TTY device associated with a particular telecommunications interface

DETAILED DESCRIPTION OF THE INVENTION

Disclosed herein is a new system and method for providing for the automatic detection of hearing impaired telephone users using a TTY device and subsequently delivering a text based notification to those users.

A variety of systems have been developed and been in use for more than ten years that provides communications systems for those who are hearing impaired or otherwise have difficulties engaging in spoken communications. These systems rely on both parties in a conversation having access to a "telecommunications device for the deaf." (TDD) A TDD system utilizes some sort of text input and output system that allows for text communication via a telecommunications system, such as a wired or wireless telephone line. TDD systems are also marketed under similar names such as TTY (telephone typewriter or teletypewriter), textphone (Europe, UK), and minicom (UK). A teletype machine or text based computer terminal such as a VT-100 analog can also be utilized as a TDD device.

A number of systems exist for providing crisis communications on behalf of a number of governmental and non-governmental entities such as police departments and utilities (i.e. agencies). Unfortunately, for the more than one percent of a population that is hearing impaired, delivery of a voice message is not suitable to notify those hearing impaired message recipients. Even if the message recipient has an assistance device, such as a TTY or TTD connected to their telephone line, the audible message is not translated into a format usable by the hearing impaired. The new system described herein provides a method to automatically detect the presence of a TTY device, and then deliver a text message to that device.

FIG. 1, attached, shows the outline of the new system. The system (100) is configurable to communicate with a TTY device (120) and the provider of the emergency message creates both a voice (130) and a text (TTY) message (at 130'). In most crisis communication systems, the recipient of the message can enter responses through an interactive voice response (IVR) system. Not all IVR systems can communicate with IVR (140), thus, at 150, the TTY capable messages must be directed to TTY capable systems. When the outbound message communication software attempts to deliver messages, the system detects response signals that indicate connection of a TTY device to the telephone line (160). If a TTY device is detected the IVR system then delivers the text TTY specific message (185). If a TTY is not detected then a voice (non-TTY) message is delivered (185').

Other features of the system may include logging of successful TTY delivery or the connection of TTY devices to the telephone line, thus allowing law enforcement or other assistance providers to take notice of those who are unlikely to respond to voice warnings or other audible signals.

The present disclosure provides a new method of detecting a wide variety of TTY devices that may be connected to a telephone line. The detection systems as described in FIG. 1 and FIG. 2, successfully detects and communicates with a connected TTY device on the fly or in real time.

Through the history of TTY device utilization since the 1970's a variety of protocols have been developed for telecommunications through a modem/terminal system. The first TTY systems (and the closely following TDD devices) used the Baudot protocol code implemented asynchronously at either 45.5 or 50 baud, 1 start bit, 5 data bits, and 1.5 stop bits. Baudot has been a commonly utilized communications protocol in the USA. However, other communications protocols are also common, for a variety of reasons. Such protocols include the "V.21" protocol, e.g., in the UK; V.23; EDT; and DTMF. These TTY protocols unfortunately were not directly compatible with "Hayes" type computer modems allowing inter-computer communications. Computers, if equipped with the proper functional software and a modem, emulate TTY devices.

As new telecommunications systems have developed, including wide access to broadband internet and cellular telephone service, the hearing impaired have increasingly utilized alternative communications systems in addition to or as an adjunct to traditional TTY devices. Short Message Service (SMS) text communication is commonly used, but is limited to only short message of less than approximately 140 characters. Additional alternatives include email, computer connected to internet instant messaging, and Internet Relay Chat (IRC).

The use of voice recognition systems for the hearing impaired have not achieved general acceptance due to continued technical difficulties. Nonetheless, a common use for a TTY device is to place calls to a Telecommunications Relay Service (TRS), allowing the hearing impaired to make telephone calls to users of audio telephones.

Recently, telecommunications providers have created systems that are better able to recognize the connection of a TTY device for inbound telephonic communications. As described in U.S. Pat. No. 6,965,664 to McIntosh, et al., a system is described that allows callers contacting call service centers to be more readily recognized as users of TTY or similar devices. Unfortunately, prior to the present disclosure, outbound call placements were hampered by the inability to reliably deliver messages in a format that TTY users who have not self-identified can reliably receive and respond to. The preset disclosure expands the ability of telecommunications providers to affirmatively contact TTY users, and to confirm utilization of TTY interfaces, thus assisting public safety in responding to emergencies more effectively. Other systems, such as that disclosed in U.S. Patent Application Publication US2006/0056598 by Brandt, are limited in the range of signals detected, and the appropriate responses thereto. For instance Brandt is configured to detect only tones of alternatively 1800 Hz or 1400 Hz, and is not configurable to log such calls for remediative action.

As shown in FIG. 2, the basic structure of an automated system, 300, for detecting the presence of a connected TTY device and for delivering and logging message delivery is shown (TTY-DDS).

The control system of the TTY-DDS system module is demonstrated in FIG. 2, panels A-C. A system administrator (administrator) for a message initiating agency (agency), determines that a message should be delivered to a group of message recipients (recipients) by means of a telecommunications delivered message, i.e. a recipient contact telephone call. Recipient contact telephone calls could be emergency notifications by a utility or governmental agency (crisis calls) or simply announcements of events or availability of services. Essentially the system and apparatus as provided herein function to ensure proper delivery of telecommunications messages in either crisis or non-crisis situations. Therefore, it should be recognized that reference to crisis communications or crisis calls in almost all situations will be applicable to a variety of telecommunications contacts wherein it is desirable to detect the presence of a connected TTY device, and to deliver an appropriately decipherable message thereto.

When a recipient contact telephone call is to be delivered by the crisis communication system, and the TTY-DDS system is active, the administrator is provided with a number of interfaces that allow for delivery of TTY messages to detected recipients. Essentially the TTY-DDS system module routes outgoing calls to a schedule of telecommunications contacts, and then directs the delivery of the recipient contact telephone call to the proper type of telephonic connection, no matter what type of telecommunications interface is connected. As illustrated in FIG. 3A, to operate the TTY-DDS system module 300, typically an administrator will create an outbound message for delivery, as shown at block 310, such as by creating an outbound message on a universal connectivity system hosted on an internet web interface. At block 320, the administrator determines whether the TTY-DDS should be utilized for the particular recipient contact campaign (campaign) being initiated.

If use of the TTY-DDS module is desired arrow 324 is followed, or if no use of the TTY-DDS module is desired, arrow 404 is followed. If arrow 324 is followed, the campaign administrator as shown by block 330, is prompted to provide a separate message to be delivered upon detection of a connected TTY device. At block 340, the administrator reviews a number of campaign related parameters for the TTY compatible campaign, such as the number of retries for telephone calls; the criteria for determining the successful status of an initiated contact (e.g., incoming call pickup, direct recipient contact; answering machine contact; message left for non-contact; no number); and caller identification. Thus, as at block 350, the primary and TTY compatible messages are routed through the elements of the calling system that contain outbound Interactive Voice Responsive (IVR) telecommunications equipment that is capable of effectively communicating with connected TTY devices. The TTY-DDS module at block 350 is also directed to later provide a TTY "flag" when a connected TTY device is detected. The telecommunications message is then sent to all available recipients according to an agency routing scheme authorized and/or provided to the administrator.

As the telecommunications system attempts to contact an incoming message recipient and deliver a message, the TTY detection module of the TTY-DDS apparatus, as shown at block 360, determines whether a live message recipient, an answering machine or a connected TTY device are present. If a live caller or an answering machine are detected, as shown by arrow 373 and block 380, the system delivers a non-text (i.e. audible) message or records an audible message on the recipient's answering machine or voice mail system, or alternatively, the module provides notification of a call recipient contact failure according to the parameters predetermined at blocks 340 (and, as described below, 410).

When a connected TTY device (or TTY using live recipient) is detected, as shown by arrow 375 and block 378, the system delivers a TTY compatible (i.e. text) TTY specific message to the connected TTY device, or alternatively, the module provides notification of a call recipient contact failure according to the parameters predetermined at blocks 340. The call recipient contact failures, whether for a TTY connection or non-TTY connection may be returned to the notify the administrator though one or more "trouble codes." Once a message is logged as being successfully delivered or an applicable trouble code is returned, the TTY-DDS system is then directed as at arrows 379 and 385 and block 390 to disconnect the call.

As noted above the TTY-DDS is directed to flag the detection of a connected TTY device. In such situations, the TTY-DDS system module logs the detection of connected TTY compatible device (arrow 393), and then delivers a notification of the detection of a connected TTY device as at block 396. Thus the agency and or the campaign administrator is effectively notified of the call location where a hearing impaired message recipient is expected to be present. The campaign-initiating agency can then take action to be certain that the communication has been delivered, or take steps to ensure the safety of the putatively hearing impaired message recipient. The ability to log the detection of a connected TTY device allows agencies responsible for public safety during incidents that warrant issuance of a crisis message provides the information necessary for a public safety agency to take action, such as a visit to a residence, that could save the life of a hearing-impaired individual.

If, as at arrow 407, no use of the TTY-DDS module is desired, the campaign administrator as shown by block 410, reviews a number of campaign related parameters for the non-TTY compatible campaign, such as the number of retries for telephone calls; the criteria for determining the successful status of an initiated contact; and caller identification. Thus, as at block 420, the primary message is sent to all available recipients according to an agency routing scheme authorized and/or provided to the administrator. As at 420, no TTY message is delivered to recipients. In some situations, the TTY detection system of the TTY-DDS may be allowed to operate, even though no TTY message is to be delivered to recipients. In such situations, the TTY-DDS system module may be allowed at the option of the administrator, for instance, to log the detection of connected TTY compatible device (block 424), and then deliver a notification of the detection of a connected TTY device as at arrow 425. When the TTY system is disabled as at 420, whether or not TTY detection is logged, arrow 427 and block 430 are representative of the possible inclusion of a module for detection of a connected answering machine.

If a live caller or an answering machine is detected, as shown be arrow 431 and block 380, the system delivers a non-text (i.e. audible) message that is not compatible with delivery of a TTY compatible message, leaves an audible message on the recipient's answering machine or voice mail system, or alternatively, the module provides notification of a call recipient contact failure according to the parameters predetermined at blocks 330 and/or 410. The call recipient contact failure may be returned to the notify the administrator as described above. Once a message is logged as being successfully delivered or an applicable trouble code is returned, the TTY-DDS system is then directed as described before to disconnect the call.

Figure 3:
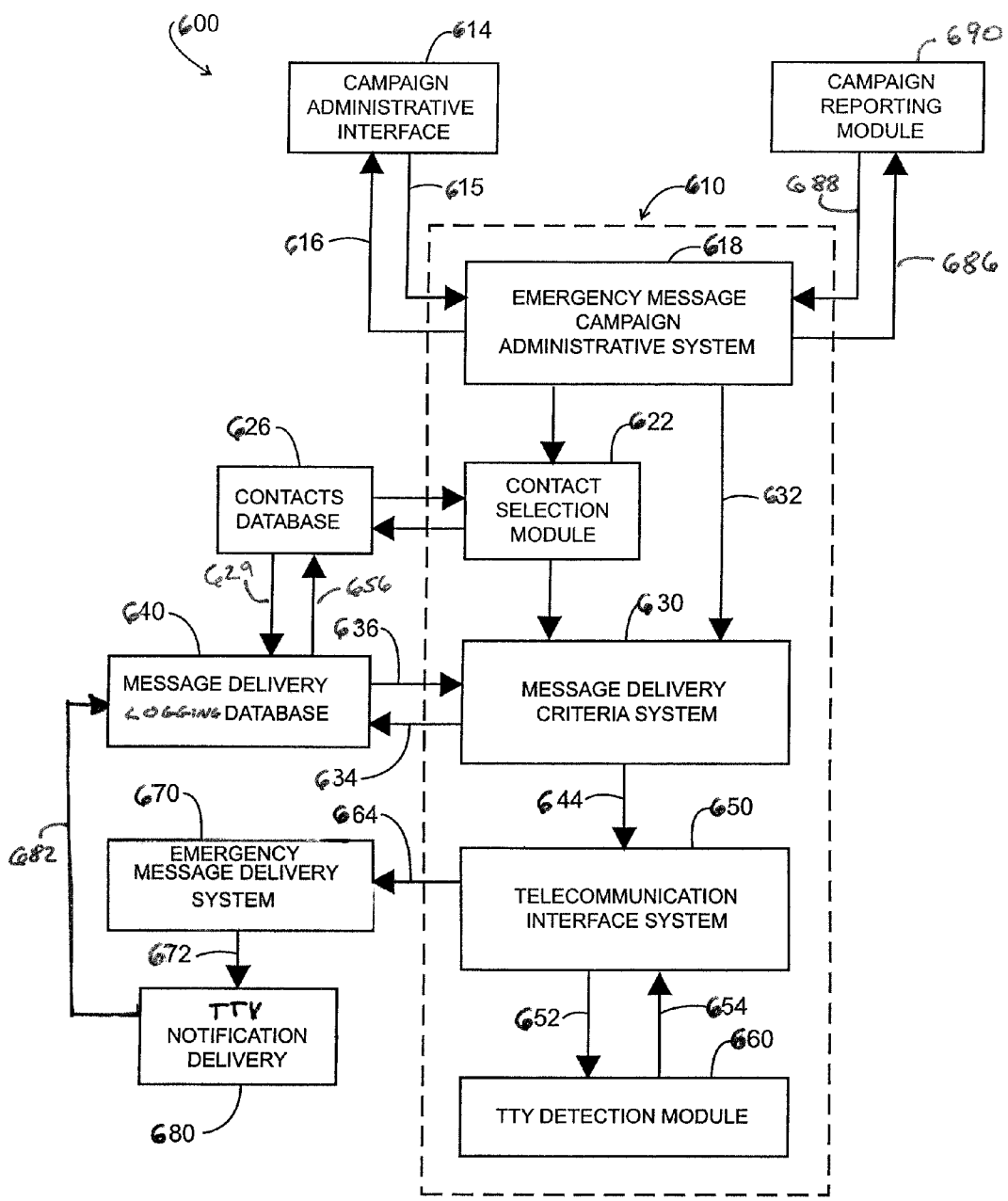
FIG. 3 shows a diagram of the apparatus for TTY detection and recording.

FIG. 3 demonstrates the configuration of the apparatus 600 utilized for implementing the presently disclosed system. Emergency campaign control system 610 is configured by a campaign administrator, acting through a campaign administrative interface 614. The administrator thus configures the administrative system 618 by transmitting commands through arrow 615, with responses to said commands being indicated though arrow 616. One aspect of the configuration of the system is the contacts selection module 622, allowing the selection of a subset of the potential contacts to receive delivery of an emergency message. Contacts selection module 622 interacts with contacts database 626, with contacts database 626 containing a multitude of telecommunications interface contacts, which may at some point be selected for delivery of a notification. Contacts database 626 is preferably maintained as part of the emergency notifications system, or alternatively by a third party, such as a public safety agency, or other governmental entity.

Contacts database 626 is in communication with message delivery logging database 640, as shown by arrow 629, thus allowing contacts database 626 to be updated via arrow 656 based on the data determined from the call results. The message delivery criteria system 630 allows for the administrator to select a number of call delivery criteria, including for instance, redial frequency, success criteria, voicemail message delivery, calling order, and the like. One criteria integrated by the message delivery criteria system is the selection of TTY compatible message delivery. Telecommunications interface system 650 allows for the delivery of messages to a variety of telecommunications systems, such as voice, VOIP, text, email, TTY compatible device, facsimile, and pagers. Interface system 650 utilizes information delivered via arrow 644 to attempt delivery to the proper or chosen telecommunications interface.

As described, the message delivery system may be optionally directed to utilize TTY detection module 660. The system is thus configurable to communicate with a TTY device; the provider of the emergency message utilizing the TTY delivery capability creates both a voice and a text message. When TTY detection module 660 is enabled, telecommunications interface 650 is configured to query the interface for the detection of a TTY device, via arrow 652. If such a device is detected by module 660, a response is delivered to telecommunications interface system 650 through arrow 654. Telecommunications interface system 650 then attempts delivery of messages associated with the selected emergency notification campaign, as shown by arrow 664. Thus, the telecommunications interface system is signaled to deliver a message through arrow 664, activating delivery system 670, and when appropriate, arrow 672 signals TTY notification delivery at box 680, whereby a TTY compatible message is delivered. If a TTY is not detected, as signaled by arrow 654, then a non-TTY message, as specified by module 630, is delivered. Message logging database 640 is updated via arrows 634, and 682 and is in communication through arrow 636. Data from the call results can be used to update contacts database 626 (as shown by arrow 656) and to generate campaign reports by campaign reporting module 690. Public safety organizations may utilize map driven campaign reports, or lists generated by blocks 690 and 626 respectively.

In part, by utilization of the disclosed system or another system configurable for detecting TTY responsive devices and interactive voice response inputs, a mappable database may be created that allows public safety officials to locate and assist those in need of either notification or emergency assistance. Thus, public safety official can utilize system as part of a method for maintaining and updating a database of individuals or households (i.e., telecommunications contacts) with identifiable emergency requirements. By keeping an updated database, those in most need of assistance in an emergency can be assisted by public safety officials, aid workers, social workers, volunteers, family, or neighbors. Each occasion that a messaging campaign is initiated, those directed to message recipients can provide an indication, (or a failure of response) of the requirement for assistance. In life-threatening situations, i.e. toxic spills, explosion risk, hurricane driven flooding, wildfire, volcanism or tsunami, where the failure to receive a response may indicate incapacitation, a non-response to an emergency query may be used to trigger further assistance, if any is available. Thus, emergency campaign messages can be directed to a number of telecommunications interfaces that allow for delivery of more than one type of telecommunications message, including TTY messages, audio messages, SMS messages, emails and voice over internet messages. For each of the delivered message types, an IVR or other response may be requested, allowing indication of the requirement for assistance, and possibly the assistance needed.

When the campaign message is created for outbound message delivery to selected contact methods, an administrator option is optionally provided allowing delivery of outbound message transmissions to include TTY devices. In addition, the administrator created message that includes a TTY message may further includes an "emergency requirement message," allowing the contact to indicate through IVR the type of assistance needed. The utilization of a logging system for recording the detection of a TTY device and responses to a queries relating to an emergency requirement message can be accessed by those capable of providing assistance. Prior systems, essentially required prior notification of public safety officials of the predicted need for emergency assistance. The described system allows public safety officials to know with relative certainty where assistance is needed, or notification has failed, thus allowing scarce resources to be most efficiently allocated. After the emergency telecommunications message is sent to identified recipients, the telecommunications interface module determines and logs into the database a message delivery status determined by the call response. The call response may be one or more of a live message recipient response, an answering machine response, a connected TTY device response, an emergency requirement response and call failure modes. Upon detection of an answering machine response, a connected TTY device response, an emergency requirement response or call failure mode, the telecommunications interface module creates a call response database entry indicating the message delivery status reflecting the response determined. Thus the call response database of telecommunications contacts with a connected TTY device, an emergency requirement, call failure mode, or other identifiable emergency requirements is updated to reflect then current status of the contact information and location of connected TTY devices, emergency requirements, call failure modes, or other identifiable emergency requirements. The call response database may be used to provide notification to the administrator or other authorized party of the call response status. The method of thus allows call response entries to be provided to one or more public safety agencies for action in response to an emergency. A wide variety of identifiable emergency requirements may be provided, including one or more of lack of transportation to flee the emergency location, a life-threatening emergency such as active fire, electrocution hazard, or health emergency, hearing-impairment preventing appropriate response to the emergency notification, the presence of pets that cannot be easily transported, or that the owner will not abandon in the emergency locale, presence of children that cannot be transported, or who are without suitable adult assistance to allow action, mobility impairment that prevents appropriate response, and limitations to access to escape routes or assistance, for instance as a result of damage to transportation facilities or because an active danger is present. In many emergency situations, the absence of reliable information prevents an efficient response by those capable of assisting, whether public employees or volunteers. In the initial stage of disaster, distribution of an emergency message may be possible. Utilizing the method to create a database of those who may need assistance while communications systems are relatively intact may provide information for effective response that cannot later be obtained after communications systems are destroyed.

While the invention has been described with reference to preferred embodiments, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Since certain changes may be made in the above compositions and methods without departing from the scope of the invention herein involved, it is intended that all matter contained in the above descriptions and examples or shown in the accompanying drawings shall be interpreted as illustrative and not in a limiting sense. In this application all units are in the metric system and all amounts and percentages are by weight, unless otherwise expressly indicated. Also, all citations referred herein are expressly incorporated herein by reference. All terms not specifically defined herein are considered to be defined according to Webster's New Twentieth Century Dictionary Unabridged, Second Edition. The disclosures of all of the citations provided are being expressly incorporated herein by reference. The disclosed invention advances the state of the art and its many advantages include those described and claimed.

What is claimed:

1. A system for delivering campaign messages over a telecommunications system comprising: a) an administrator for a message initiating agency; b) a group of message recipients of a message delivered by means of a telecommunications system; c) a number of telecommunications interfaces that allow for delivery of more than one type of telecommunications message, including TTY messages, audio messages, SMS messages, emails and voice over internet messages; d) an administrator created outbound message for delivery to a selection of said telecommunications interfaces associated with message recipients; e) administrator selection of campaign related parameters; f) an administrator option for allowing delivery of said outbound message to telecommunications interfaces that include TTY devices; g) an administrator created TTY message activated when the administrator has selected the option for delivering outbound messages to TTY devices; f) a telecommunications interface module that is capable of detecting the presence of a connected TTY device; and h) a logging system for recording in a logging database the detection of a TTY device associated with a particular telecommunications interface; i) following activations by said administrator, said telecommunications messages are then sent through selected telecommunications interfaces to a selection of message recipients according to an agency routing and the said campaign message delivering system determined by the administrator selection of campaign related parameters; i) following connection of telecommunications interfaces with the telecommunications interface module, said telecommunications interface module determines whether one or more of a live message recipient, an answering machine a connected TTY device or call failure modes are present; k) said telecommunications interface module then updates the logging database and provides notification of a call recipient contact failure according to the parameters predetermined by the administrator selection of campaign parameters; l) upon detection of a connected TTY device said system delivers a TTY compatible message to the connected TTY device, or provides notification of a call recipient contact failure according to the predetermined parameters, said telecommunications interface module then updates the logging database to reflect the detection of a connected TTY device; and m) upon completion of one or more of the said steps, disconnects the call, wherein the system delivers the campaign message to one or more telecommunications interfaces, delivers a TTY compatible message or provides a notification to said administrator of the detection of a connected TTY device, and records the incidence of failures to deliver the campaign message.

2. The system for delivering campaign messages over a telecommunications system of claim 1, wherein the messaging system is configurable to automatically differentiate between telecommunications interfaces connected to the connected TTY device and those telecommunications interfaces not connected to any connected TTY device.

3. The system for delivering campaign messages over a telecommunications system of claim 1, wherein the telecommunications interface module is configured to issue a connected TTY device prompt, monitor the connected telecommunications interface for a responsive signal prompt from a connected TTY device, then further issues a confirmation connected TTY device prompt and further monitors the connected telecommunications interface for a confirmation responsive signal prompt from the connected TTY device.

4. The system for delivering campaign messages over a telecommunications system of claim 1, wherein the telecommunications interface module is configured to monitor a connected telecommunications interface for periodic signals issued by a connected TTY device, and then further issues a confirmation connected TTY device prompt and further monitors the connected telecommunications interface for a confirmation responsive signal prompt from the connected TTY device.

5. The system for delivering campaign messages over a telecommunications system of claim 3, wherein the connected TTY device prompt and the confirmation connected TTY device prompt are signals with different characteristics.

6. The system for delivering campaign messages over a telecommunications system of claim 2, wherein the messaging system configurable to automatically differentiate between telecommunications interfaces connected to the connected TTY device and those telecommunications interfaces not connected to any connected TTY device, differentiates between said telecommunications interfaces by monitoring responses received to query prompts issued by the messaging system said query prompts being one or more of a speech-based query prompts, a language related speech-based query prompt, a modem handshake query prompt, a hearing-impaired user query prompt, at least one dual tone multi-frequency (DTMF) signal tone query prompt, and a TTY query prompt.

7. The system for delivering campaign messages over a telecommunications system of claim 6 wherein the hearing-impaired user query prompt is suitable for contacting telecommunications interfaces of hearing-impaired users and said hearing-impaired user query prompt is one or more of a Baudot-compliant query prompt, a DTMF signal, an ASCII signal, an approximately 1800 Hz signal, and an approximately 1400 Hz signal.

8. The system of claim 1 wherein said administrator option for allowing delivery of said outbound message to telecommunications interfaces that include TTY devices has not been selected, and the system provides notification to said administrator of the detection of a connected TTY device, and the incidence of failures to deliver a campaign message.

9. The system for delivering campaign messages over a telecommunications system of claim 6 wherein the response to said query prompt is one or more of a voice response, a machine recognizable voice response, a Baudot-compliant response, a DTMF signal, one or more approximately 1800 Hz signals, one or more approximately 1400 Hz signal, a combination of one or more approximately 1800 Hz signals and approximately 1400 Hz signals, a keyed response, and a keyboard generated DTMF response.

10. The system for delivering campaign messages over a telecommunications system of claim 6, wherein the system monitors responses received to a query prompt issued by the messaging system and issues a second query prompt when the response to the query prompt received from a telecommunications interface is not a compliant response.

11. The system for delivering campaign messages over a telecommunications system of claim 10, wherein the system redirects the telecommunications interface be connected to one or more of a DTMF compatible platform, a TTY compatible platform, a voice message system, a live operator, and a call-back log, should the telecommunications interface fails to respond to the second query prompt with a compliant response.

12. The system for delivering campaign messages over a telecommunications system of claim 1, wherein a query prompt is selected so as to cause a device associated with the hearing-impaired caller to generate at least one signal in response to the a query prompt, issuing at least one prompt requesting that the given caller generate at least one DTMF tone by pressing at least one key on a keypad.

13. The system for delivering campaign messages over a telecommunications system of claim 3, wherein, for all call recipients, the telecommunications interface module issues a connected TTY device prompt, and monitors the connected telecommunications interface for a responsive signal prompt from a connected TTY device, and then further issues a confirmation connected TTY device prompt only after receiving a responsive signal prompt.

14. The system for delivering campaign messages over a telecommunications system of claim 3, wherein the system is configured to issue either a connected TTY device prompt, or a confirmation connected TTY device prompt without regard to the timing of a responsive signal prompt from a connected TTY device.

15. The system for delivering campaign messages over a telecommunications system of claim 3, wherein the telecommunications interface module issues the connected TTY device prompt to the connected telecommunications interface and after a pre-defined period of time expires with no response to the connected TTY device prompt, then further issues a confirmation connected TTY device prompt and further monitors the connected telecommunications interface for a confirmation responsive signal prompt from the connected TTY device.

16. The system for delivering campaign messages over a telecommunications system of claim 1, wherein the system is configured to identify one or more of at least one signal having a frequency of approximately 1,400 Hertz identifying, at least one signal having a frequency of approximately 1,800 Hertz.

17. The system for delivering campaign messages over a telecommunications system of claim 1, wherein the telecommunications interface module is capable of identifying a plurality of response signals, wherein the response signal is one or more of a plurality of signals with frequency of approximately 1,800 Hertz, a plurality signals, at least one of which has a frequency of approximately 1,400 Hertz, at least one signal that substantially corresponds to a response expected following the connected TTY device prompt or the confirmation responsive signal prompt, a DTMF tone, speech input from the at least one call recipient, a DTMF response, a Baudot-compliant response, for routing the call to a TDD/TTY platform based on received responses from a connected telecommunications interface.

18. The system for delivering campaign messages over a telecommunications system of claim 1, wherein the computer-based subsystem includes means for performing a plurality of evaluations of the response in parallel.

19. The system for delivering campaign messages over a telecommunications system of claim 18, wherein the speech recognition platform includes means for processing the call so as to enable the given caller to submit data for entry into a data store.

20. The system for delivering campaign messages over a telecommunications system of claim 17, wherein the telecommunications interface module is configured for processing the call using a grammar that is specially defined for use a connected TTY device.

21. A method of maintaining and updating a database of telecommunications contacts with identifiable emergency requirements comprising delivering campaign messages over a telecommunications system by an administrator for a message initiating agency directed to a group of message recipients of a message delivered by means of a telecommunications system, comprising: a) said campaign messages are directed to a number of telecommunications interfaces that allow for delivery of more than one type of telecommunications message, including TTY messages, audio messages, SMS messages, emails and voice over internet messages; b) the campaign message is an administrator created outbound message for delivery to said telecommunications interfaces; c) an administrator option is provided for allowing delivery of said outbound message to telecommunications interfaces that include TTY devices; d) an administrator created message is provided that includes a TTY message when the administrator has selected the option for delivering outbound messages to TTY devices and further includes an emergency requirement message; e) administrator selection of campaign related parameters; f) a telecommunications interface module that is capable of detecting the presence of a connected TTY device, responses to query prompts relating to the emergency requirement message; and g) a logging system for recording the detection of a TTY device associated with a particular telecommunications interface, and a response to a query prompt relating to the emergency requirement message; h) said telecommunications message is then sent to all available recipients according to an agency routing and the said campaign message delivering system; i) said telecommunications interface module determines a message delivery status determined by whether one or more of a live message recipient response, an answering machine response, a connected TTY device response, an emergency requirement response or call failure modes are present; j) upon detection of an answering machine response, a connected TTY device response, an emergency requirement response or call failure mode, creates a database entry indicating the message delivery status reflecting the response determined; and k) upon completion of one or more of the said steps, disconnect the call, wherein the database of telecommunications contacts with a connected TTY device, an emergency requirement, call failure mode, or other identifiable emergency requirements is updated to reflect the contact information or location of said connected TTY devices, emergency requirements, call failure modes, or other identifiable emergency requirements and provides notification to said administrator of the detection of a connected TTY device, emergency requirements, call failure modes, or other identifiable emergency requirements and the incidence of failures to deliver a campaign message.

22. The method of claim 21 wherein the contact information or location of telecommunications contacts utilizing a connected TTY device, an emergency requirement, call failure mode, or other identifiable emergency requirements is provided to one or more public safety agencies for action in response to an emergency.

23. The method of claim 21 wherein identifiable emergency requirements include one or more of lack of transportation, life-threatening emergency, hearing impairment, pets, children, mobility impairment, and limited access.

24. A method for identifying a call recipient with a connected TTY device comprising: a) a system for delivering campaign messages over a telecommunications system; b) an administrator for a message initiating agency, selecting campaign related parameters; c) a group of message recipients of a message delivered by means of the telecommunications system; d) a number of telecommunications interfaces that allow for delivery of a TTY compatible message; e) an administrator created outbound message allowing delivery of said outbound message to telecommunications interfaces that include TTY devices; f) a telecommunications interface module that is capable of detecting the presence of a connected TTY device; and h) a logging system for recording the detection of a TTY device associated with a particular telecommunications interface; i) said telecommunications message is then sent to identified recipients according to an agency routing scheme provided by the administrator, and said telecommunications interface module determines whether one or more of a live message recipient, a connected TTY device or call failure modes are present, and upon detection of a connected TTY device said system delivers a TTY compatible prompt to the connected TTY device; j) logs the detection of a TTY device associated with a particular telecommunications interface in a database associated with the logging system for recording the detection of a TTY device associated with a particular telecommunications interface; and j) upon completion of the said steps, disconnects the call, Wherein the system provides notification to said administrator of the detection of a connected TTY device, and the incidence of failures to deliver a campaign message and updates a database storing information on the contact parameters for a TTY device associated with a particular telecommunications interface.

* * * * *